United States Patent
Kumar et al.

(10) Patent No.: US 8,355,896 B2
(45) Date of Patent: Jan. 15, 2013

(54) CO-OCCURRENCE CONSISTENCY ANALYSIS METHOD AND APPARATUS FOR FINDING PREDICTIVE VARIABLE GROUPS

(75) Inventors: Shailesh Kumar, San Diego, CA (US); Junwen Wu, San Diego, CA (US); Vesselin Diev, San Diego, CA (US)

(73) Assignee: Fair Isaac Corporation, Roseville, MN (US)

( * ) Notice: Subject to any disclaimer, the term of this patent is extended or adjusted under 35 U.S.C. 154(b) by 1170 days.

(21) Appl. No.: 12/202,933

(22) Filed: Sep. 2, 2008

(65) Prior Publication Data

US 2010/0057509 A1    Mar. 4, 2010

(51) Int. Cl.
*G06F 17/50* (2006.01)
*G06Q 30/00* (2006.01)
*G06Q 99/00* (2006.01)

(52) U.S. Cl. ....... 703/2; 705/14.26; 705/14.47; 705/318
(58) Field of Classification Search .................. 703/5, 2; 705/14.26, 14.47, 318

See application file for complete search history.

(56) References Cited

U.S. PATENT DOCUMENTS

| | | | |
|---|---|---|---|
| 2007/0094066 A1* | 4/2007 | Kumar et al. | 705/10 |
| 2007/0094067 A1* | 4/2007 | Kumar et al. | 705/10 |
| 2007/0100680 A1* | 5/2007 | Kumar et al. | 705/10 |

OTHER PUBLICATIONS

"Positional Dependence, Cliques, and Predictive Motifs in the bHLH Protein Domain", Atchley et al. Dec. 15, 1997.*
"A Graph-theoretic Algorithm for Comparative Modeling of Protein Structure", Samudrala et al. 1998.*
"A computational scheme for reasoning in dynamic probabilistic networks", Kjaerulff. 1988.*
"Finding All Cliques of an Undirected Graph", Bron et al. Communications of the ACM, Sep. 1973.*

* cited by examiner

*Primary Examiner* — Dwin M Craig
*Assistant Examiner* — Nithya Janakiraman
(74) *Attorney, Agent, or Firm* — Mintz, Levin, Cohn, Ferris, Glovsky and Popeo, P.C.

(57) ABSTRACT

A method of modeling includes quantifying a co-operative strength value for a plurality of pairs of variables, and identifying a clique of at least three variables based on a graph of the co-operative strength values of a plurality of pairs of variables. The method also includes selecting a first pair of variables of the plurality of pairs of variables having a high co-operative strength value. A second clique may also be identified. A model of the first clique and a model of the second clique are made. The outputs of these models are combined to form a combined model which is used to make various decisions with respect to real time data.

18 Claims, 5 Drawing Sheets

CO-OCCURRENCE CONSISTENCY ANALYSIS METHOD AND APPARATUS FOR FINDING PREDICTIVE VARIABLE GROUPS

TECHNICAL FIELD

Various embodiments described herein relate to apparatus, systems, and methods for co-occurrence consistency analysis. More specifically, the apparatus, systems and methods are directed toward co-occurrence consistency analysis for finding predictive variable groups.

BACKGROUND INFORMATION

With the increase in communications and electronic transactions, incidents of fraud surrounding these activities has increased. For example, "cloning" a cellular telephone is a type of telecommunications fraud where an identifier, such as a serial number, for a cellular telephone is snooped, or read, as calls are transmitted, captured, and used to identify calls transmitted by other cellular telephones. When the other cellular telephones transmit calls, the calls may be fraudulently charged to the account holder for the original cellular telephone.

Another fraudulent activity includes stealing credit card numbers. Some workers carry small readers for reading the vital information from a credit card. A person may get a job as a waiter or cashier in a restaurant and when the customer provides his credit card, the credit card may be swiped as part of payment and swiped again using the small reader. The credit information is captured and then the person misappropriating the credit card information will use the information to make unauthorized purchases, or sell the information related to the credit card to others who will place unauthorized purchases. There are other schemes where a group of bad actors set up bogus automated teller machine (ATM) machines. In one instance, a convenience store owner was given $100 to allow a bogus machine to be placed in the store. The automated teller machine (ATM) included a reader only so prospective customers would use the machine and then complain that it did not dispense money. The bad actor would pick up the machine after several days and take it for "repair" and would never return. The misappropriated credit card numbers would then be either sold or used to make various purchases.

In short, various fraudulent schemes result in large losses to various institutions. Generally, the losses are billions of dollars per year. Therefore, there is large demand for systems and methods to detect fraudulent transactions. Some current systems and methods attempt to detect fraudulent transactions by constructing a model based on historical observations or transactions. By observing a large number of transactions, characteristics of fraud may be derived from the data. These characteristics can be then be used to determine whether a particular transaction is likely to be fraudulent.

For example, characteristics of 100,000 transactions, such as phone calls or points of sale, can be captured and later characterized as fraudulent or legitimate. The fraudulent calls in the 100,000 calls may share similar characteristics and transaction patterns that are used to build static model that indicate the probability of fraud for incoming transactions. Similarly, the fraudulent credit card transactions in the 100,000 transactions may share a different set of similar characteristics and transaction patterns. The similar characteristics, in either case, are used to build static model that indicate the probability of fraud for an incoming transactions, such as transactions associated with phone calls, point of sale transactions, internet sales transactions, and the like. In certain systems, these static, historical models can be used in a production, or real-time, environment to evaluation a probability of fraud for incoming transactions. However, creation of the historical model may be difficult to deploy.

The models formed for production generally include an indication of fraudulent or non-fraudulent activity. Historical transaction data is reviewed for variables that give indications of fraudulent activity. The variables are generally associated with one another in building a model on which to base future predictions of fraud can be made. One of the fundamental challenges in modelling is variable selection or finding a group of variables that will predict the fraud best. Theoretically, each variable group out of all the available variables may be evaluated by some objective criterion such as accuracy of model prediction on a test data set, and the best variable group may be chosen to build the final model. Such an exhaustive search for a variable group uses an inordinate amount of resources and becomes largely non scalable and impractical for large number of variables. This approach takes up large amounts of computing time and requires high amounts of computing resources, such as use of several parallel processors. One common and almost universally practiced class of methods for variable selection is termed a greedy method. In this, the top variables incrementally are combined in the model. In the forward selection method, a particular greedy method, the top variable is first selected as a starting variable. The remaining variables are re-evaluated and then the variable having the highest value, given all the previous variables selected so far, is selected as the next variable in the model. Although fast and practical, this has the obvious disadvantage of giving a potentially local maxima depending on the first variable selected. Another fundamental problem with trying to find a single variable group to find fraud is that it assumes that there is only one reason for the fraud as only one group of variables is sufficient to predict it. This again, is a fallacy because there can be several possible reasons for fraud and different variable groups might indicate different possible reasons for fraud. Thus, there is a need for another method of selecting variables for model building, one that avoids the pitfall of finding a local maxima by being so greedy as the forward selection method and at the same time allows for finding multiple variable groups, each capturing a different form of fraud.

DETAILED DESCRIPTION

Figure 1:
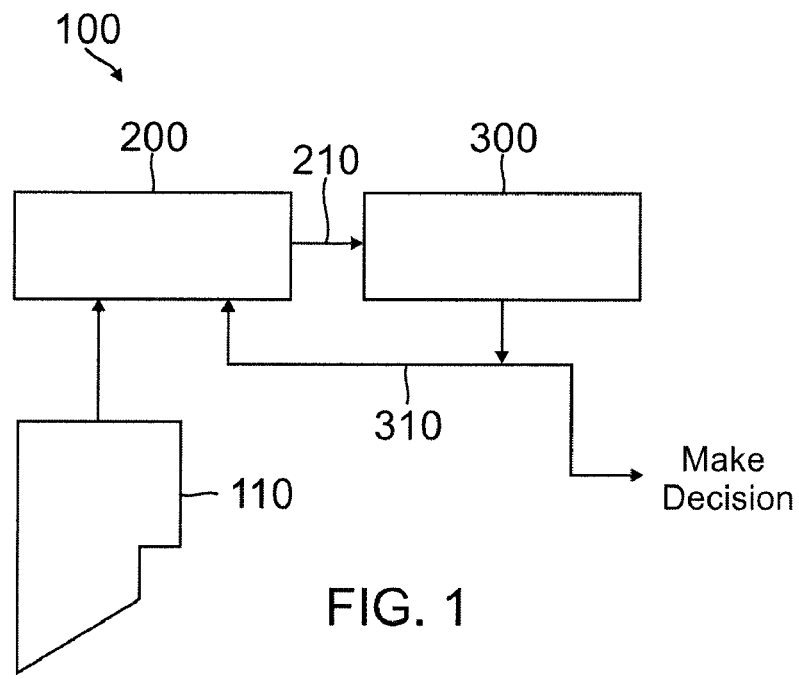
FIG. 1 is a schematic diagram of a fraud detection system, according to an example embodiment.

FIG. 1 is a block diagram of an example fraud detection system 100 that uses at least one embodiment of the invention. As shown in FIG. 1, the fraud detection system 100 includes a learning component 200 and a predictive/scoring component 300. The learning component 200 processes historical data 110 and recognizes various patterns. The learning component has an output 210. The output 210 from the learning component 200 is a model that can be used with live or substantially real time data to predict or detect a fraud. The output 210 of the learning component 200 is input to the predictive/scoring component 300 which categorizes the transaction as fraudulent and scores the likelihood that the transaction is fraudulent. This output 310 can then be used by an institution that can either approve or disapprove a transaction. The output 310 can also be fed back into the learning component 200 to be used by the learning component 200 to further refine the model, represented by output 210 of the learning component 200.

Figure 2:
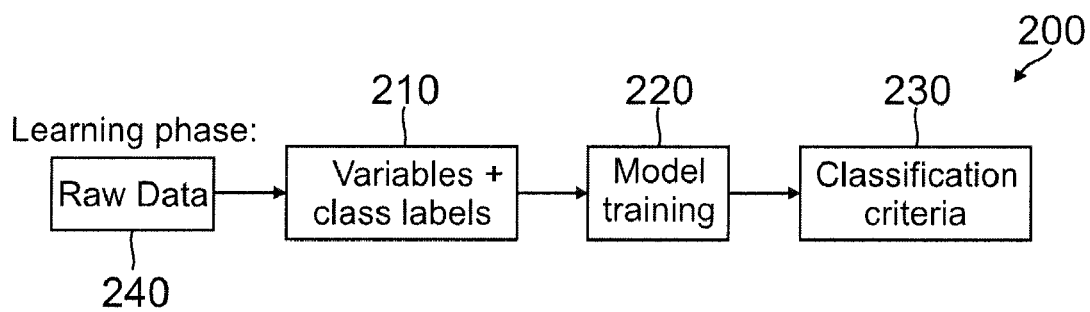
FIG. 2 is a schematic diagram of a learning component of the fraud detection system, according to an example embodiment.

FIG. 2 is a schematic diagram of a learning component 200 of the fraud detection system 100, according to an example embodiment. The learning component 200 includes a variable extractor 210, a model trainer 220 and a classifier 230. The learning component 200 uses historical data as a raw data input 240. The historical data includes whether a particular transaction was in fact fraudulent. The process used by the learning component 200 includes taking raw data 240 and extracting variables (features) from the raw data 240 at the variable extractor 210. Pre-defined class label—1 for fraud and 0 for non-fraud, for example —is used as the target variable. A learning algorithm is used to detect patterns for classification. The detected patterns are used to build and train a model at the model trainer 220. The model is trained such that the various variables used will produce the proper classification at the classifier 230. In fraud detection, the transactions are classified as fraudulent or not fraudulent. When classifying new data instances, such as when a new transaction is occurring in real time or substantially real time, the classification criteria learned in the learning component 200 are used to make a prediction.

Figure 3:
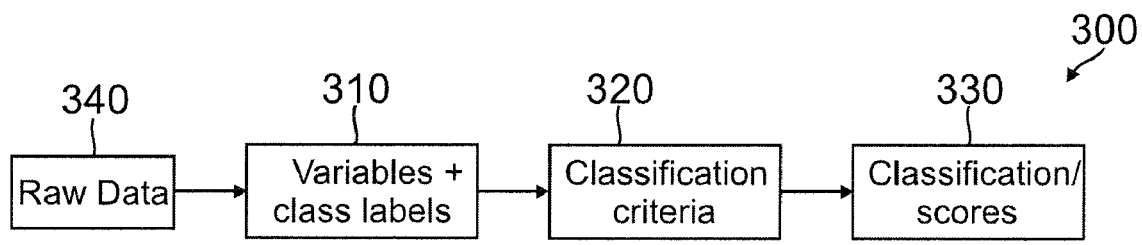
FIG. 3 is a schematic diagram of a predictive/scoring component of the fraud detection system, according to an example embodiment.

FIG. 3 is a schematic diagram of a predictive/scoring component 300 of the fraud detection system 100, according to an example embodiment. The predictive/scoring component 300 includes a source of raw data 340. The raw data 340 are transactions that are occurring in real time or substantially real time. In other words, the transactions are occurring or have occurred shortly beforehand. The predictive/scoring component 300 also includes a variable extractor 310. The variables that were determined to be relevant in the learning module 200 (see FIG. 2) are extracted from the raw data 340. The variables are also labeled in the variable extractor 310. The predictive/scoring component 300 also includes a classification applicator 320. The classification applicator 320 applies the classification criteria learned in the learning component 200 (see FIG. 2) to the variables. These classification criteria are then placed into a statistical model and a score is produced. The output of the predictive/scoring component 300 is a classification (fraud or no-fraud) and a confidence measure. Scoring the transaction is the confidence measure. The score can be restricted to a real number between 0 and 1 with the boundary values corresponding to pure no-fraud and fraud, respectively. As a result, the model score can be treated as a probability of a transaction being fraudulent. If a transaction is represented by a data point X, where X is of n-dimensions (a field in the transaction representing a dimension), we have.

$$Score(X)=Pr(Fraud|X)$$

Figure 4A:
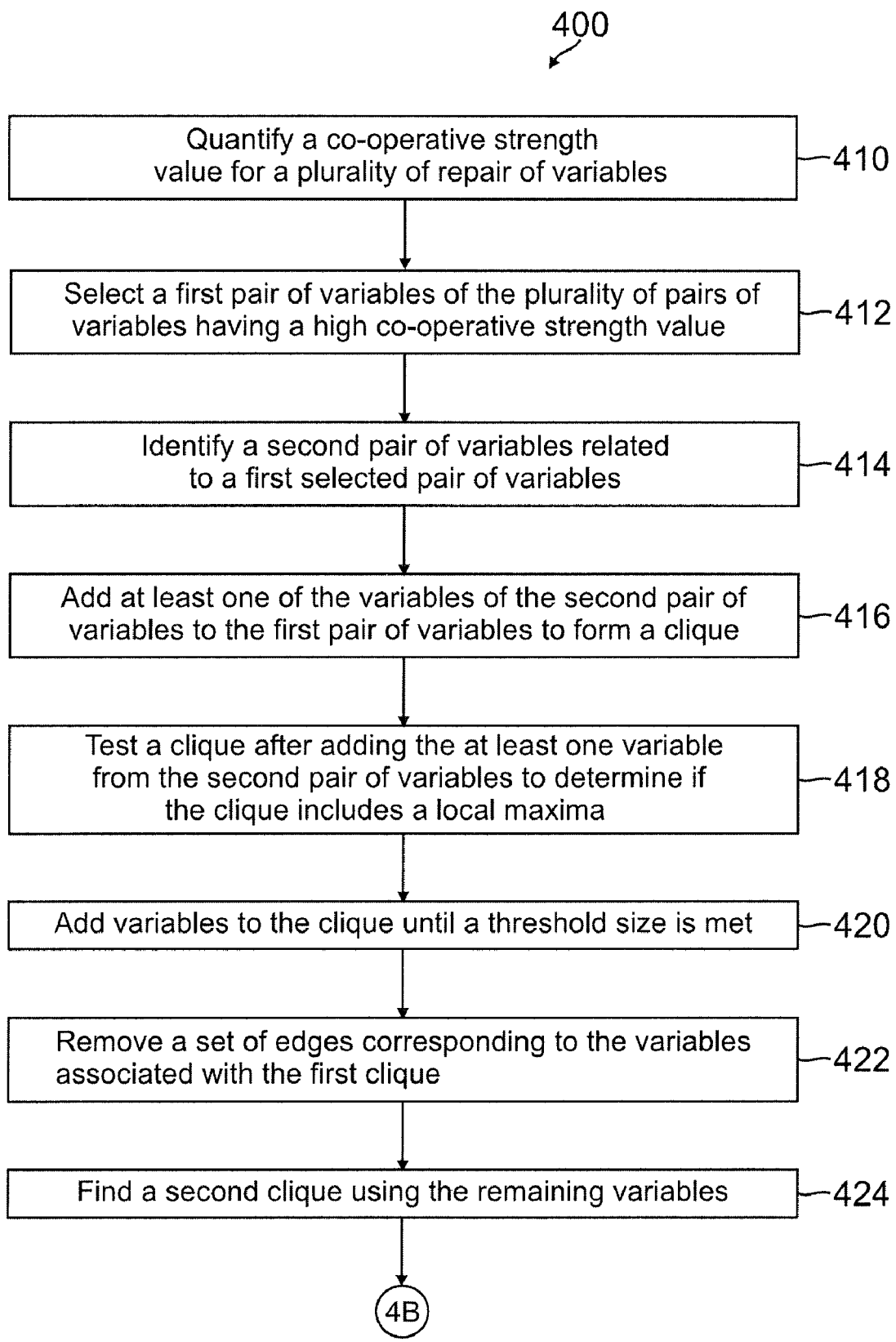
FIGS. 4A and 4B are flow charts of a method making fraud determinations, according to an example embodiment.
Figure 4B:
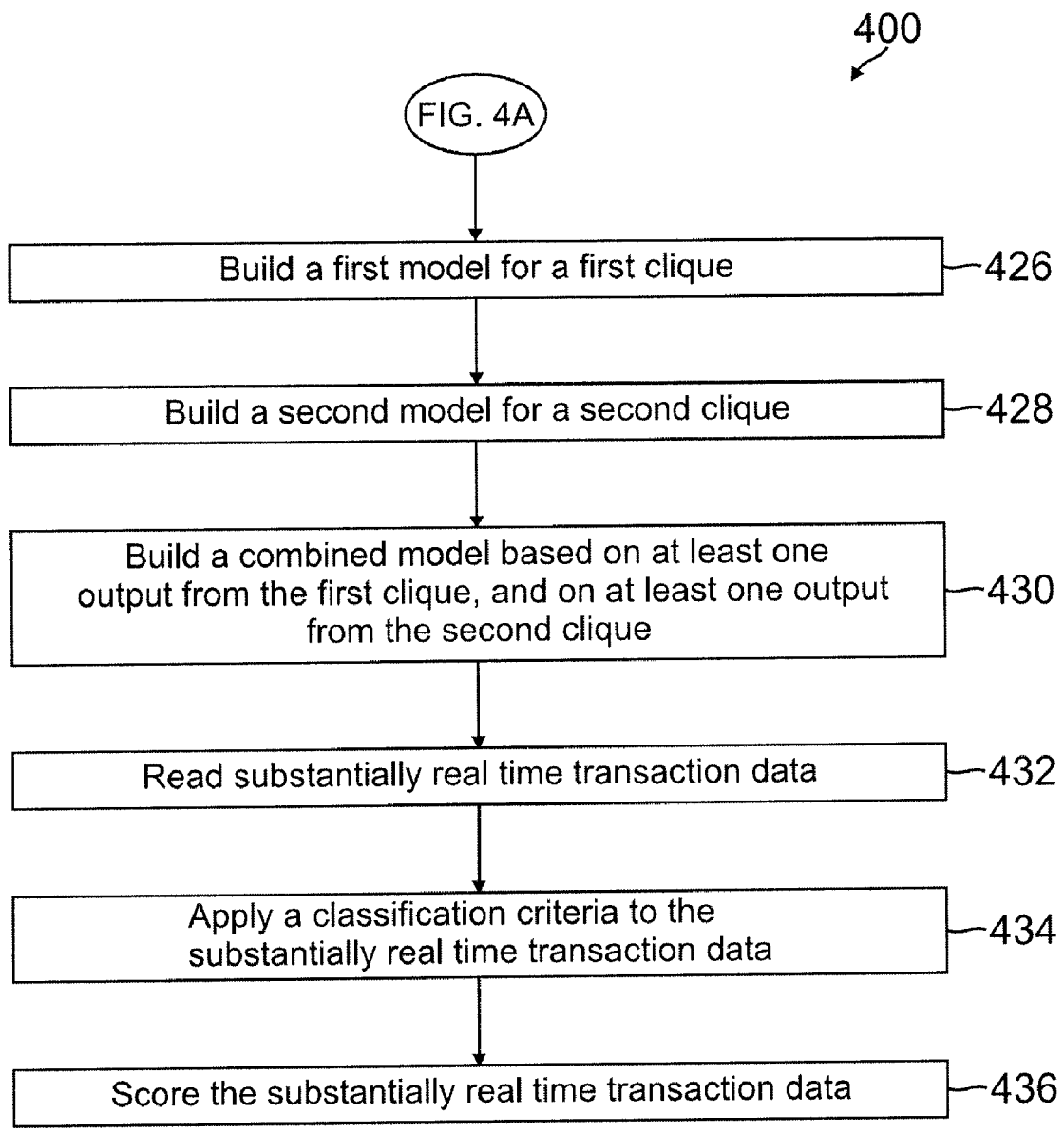

Returning to FIG. 2, the learning component 200 includes the variable extractor 210 which extracts relevant variables from the raw historical data 240 reflecting various past transactions. The variables are selected within the variable extractor 210 of the learning component 200, according to a method 400 for making fraud determinations, according to an example embodiment. The method 400 operates in the variable extractor 210 and in the model training component 220. The method 400, as set forth in FIGS. 4A and 4B, includes quantifying a co-operative strength value for a plurality of pairs of variables 410, and selecting a first pair of variables of the plurality of pairs of variables having a high co-operative strength value 412. In one embodiment of the method 400 finding the co-operative strength value between pairs of variables 412 further includes using both the supervised predictive co-operation and unsupervised correlation based co-operation between all attribute pairs that the two variables can jointly take, and combining all these joint attribute pair correlations between the two variables into a single variable pair co-operation strength. The method 400 also includes identifying subsequent variables related to a variable pair 414 selected so far. Upon identifying the third variable 414, if the new cohesiveness of the three variables is larger than the cohesiveness of all the pairs of variables, then the variable triplet becomes the new active variable and the process continues to add subsequent variables 416 to form a clique. In one embodiment, identifying a clique of at least three variables is based on a graph of the co-operative strength values of a plurality of pairs of variables. The method 400 also includes testing a clique after adding each next variable to determine if the clique includes a local maxima 418. Testing the clique 418, in one embodiment, includes determining if a cohesiveness value drops when a variable is added to the clique or when a variable is removed from the clique. The method 400, in some embodiments, also includes adding variables to the clique until a threshold size is met 420. After finding one clique, a second clique can be found using all the variables i.e. a variable can be a part of more than one clique, by using the remaining variables 424. In still another embodiment, a set of edges corresponding to the variables associated with the first clique are removed 422 before selecting the second clique. The method 400 may also include identifying a second clique of at least two variables based on a graph of the co-operative strength values of a plurality of pairs of variables.

The model training component 220 of the learning component 200 can then be used to build a model, according to an example embodiment (see FIG. 2). The method 400 further includes building a first model for a first clique 426, building a second model for a second clique 428, and building a combined model 430 based on at least one output from the first clique, and on at least one output from the second clique. The method 400 further includes reading substantially real time transaction data 432, applying classification criteria to the substantially real time transaction data 434, and scoring the substantially real time transaction data 436. The transaction data is classified as fraudulent based on whether the score is above a predefined threshold.

Figure 5A:
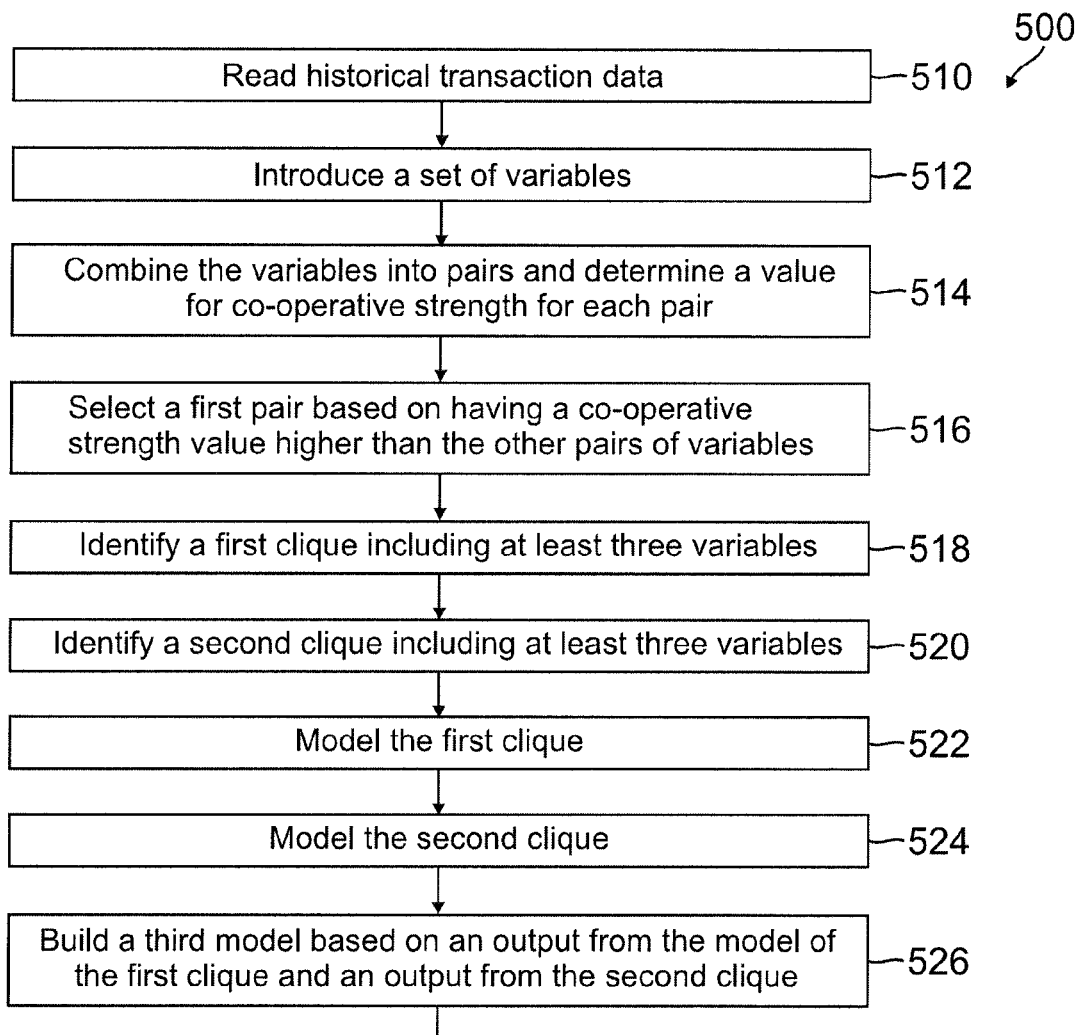
FIGS. 5A and 5B are flow charts of a method making fraud determinations, according to another example embodiment.
Figure 5B:
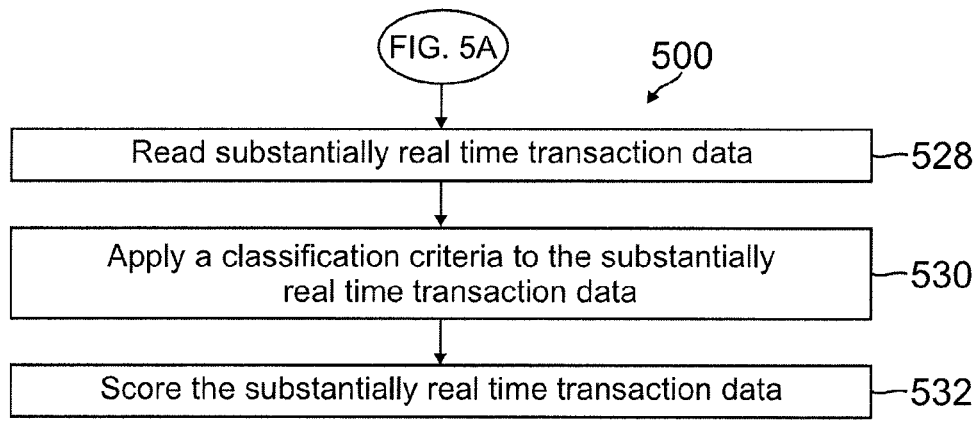

FIGS. 5A and 5B are flow diagrams of a method 500 for predicting the probability that a transaction is fraudulent, according to an example embodiment. The method 500 includes reading historical transaction data 510, introducing a set of variables 512, combining the variables into pairs and determining a value for co-operative strength for each pair 514, and selecting a first pair based on having a co-operative strength value higher than the other pairs of variables 516. The method 500 also includes identifying a first clique including at least two variables 518, and, identifying a second and subsequent cliques including at least two variables 520. The first clique is modeled 522, and the second clique is modeled 524. The method 500 also includes building a third model based on an output from the model of the first clique and an output from the second clique 526 and subsequent cliques. The method 500 further includes reading substantially real time transaction data 528, applying classification criteria to the substantially real time transaction data 530, and scoring the substantially real time transaction data 532. The transaction data is classified as fraudulent based on whether the score is above a predefined threshold.

The following is one example of computing a consistency matrix of variables. The variables can be discrete or continuous. The approach for determining a consistency matrix differs based upon the type of variable. Consistency measures how much more likely it is for two features to take on particular values compared to random. Different consistency metrics are utilized in this study based on whether variables are discrete or continuous.

In the discrete case, the classic metric is a point-wise mutual information (or Point-wise MUtual Information— also referred to herein as PMUT) between variables. Three similarity measures which utilize the co-occurrence probability $P_{p,q}(\alpha,\beta)$ where variable p takes the value $\alpha$ and variable q takes the value $\beta$ will be explored. Point-wise Mutual information is a consistency measure which compares the Cosine and Jaccard Coefficient definitions of consistency.

Point-Wise Mutual Information:

NOTE: PMUI has been known to give higher values for rarer (low margin) denominators. To smooth out the effect, here is a suggested modification to the PMUI:

$$\phi_{p,q}(\alpha,\beta) = \log\left[\gamma \times \frac{P_{p,q}(\alpha,\beta)}{P_{p,q}(\cdot,\beta)P_{p,q}(\alpha,\cdot)}\right]$$

$$\gamma = \frac{\eta_{p,q}(\alpha,\beta)}{1+\eta_{p,q}(\alpha,\beta)} \times \frac{\min\{\eta_{p,q}(\alpha,\cdot),\eta_{p,q}(\cdot,\beta)\}}{1+\min\{\eta_{p,q}(\alpha,\cdot),\eta_{p,q}(\cdot,\beta)\}}$$

Cosine:

$$\phi_{p,q}(\alpha,\beta) = \frac{P_{p,q}(\alpha,\beta)}{\sqrt{P_{p,q}(\cdot,\beta)P_{p,q}(\alpha,\cdot)}}$$

Jaccard coefficient $$\phi_{p,q}(\alpha,\beta) = \frac{P_{p,q}(\alpha,\beta)}{P_{p,q}(\cdot,\beta)+P_{p,q}(\alpha,\cdot)-P_{p,q}(\alpha,\beta)}$$

Consistency between variables is then determined by the expected co-occurrence between all the value pairs.

$$\mu_{p,q} = \sum_{\alpha=1}^{M_p}\sum_{\beta=1}^{M_q} P_{p,q}(\alpha,\beta)\phi_{p,q}(\alpha,\beta)$$

A consistency matrix is then defined based on the values of consistency between sets of variables. This gives us the variable consistency matrix for the discrete variables:

$$M=[\mu_{p,q}]_{D\times D}:\forall 1\leq p,q\leq D$$

As mentioned previously, the approach for a Continuous Consistency Matrix is different. For continuous variables, we use Pearson's product-moment coefficient to evaluate the consistency, which is defined as:

$$\rho_{p,q} = \frac{\text{cov}(X_p,X_q)}{\sigma_p\sigma_q} = \frac{E((X_p-\mu_p)(X_q-\mu_p))}{\sigma_p\sigma_q}$$

The consistency matrix then trivially becomes:

$$M=[\rho_{p,q}]_{D\times D}:\forall 1\leq p,q\leq D$$

With the variable consistency matrix, the variable dependencies can be learned, and further operations can be carried out.

Regarding the consistency between a variable and the target, the Fisher discriminator is used and takes into account the separation between the classes that a variable provides:

$$\rho(Y,X_i) = \frac{(\mu_{i0}-\mu_{i1})^2}{\sigma_{i0}^2+\sigma_{i1}^2}$$

Where Y is the target, taking on values 0 and 1, and $X_i$ is the $i^{th}$ variable in the data set.

Variable Selection based on Variable Consistency (VS1) includes forming a consistency matrix that contains information on the consistency between any pair of variables including the target. After selecting an initial pair of variables, the variables that are most correlated with the target and at the same time least correlated with other variables selected so far is selected as the next variable. This strategy eliminates redundancy caused by highly correlated variables and at the same time improves performance by including variables that are well correlated with the target variables.

The method includes building the consistency matrix for all variables and the target, and sorting the variables consistency with respect to the target in descending order and choosing the top N variables to be seeds. For each seed $X^l$, if k variables selected so far, select the $X^{k+1}$ variable based on:

$$X^{k+1} = \underset{X_j\in X\setminus X^k}{\operatorname{argmax}} \frac{\rho(X_j,Y)}{\max_{X_i\in X^k}\{\rho(X_j,X_i)\}}$$

or $$X^{k+1} = \underset{X_j\in X\setminus X^k}{\operatorname{argmax}}\left[\rho(X_j,Y)-\lambda\cdot\max_{X_i\in X^k}\{\rho(X_j,X_i)\}\right]$$

Where $\rho(a,b)$ is the consistency between 2 variables a and b, or the Fisher discriminator between a variable and the target; $X^k$ is the set of selected variables; $X\setminus X^k$ is the set of remaining variables. All remaining variables are selected in this manner and are placed in order of selection. A Logistic/Linear Regression models is built on the top k to n variables selected above to find the optimal set; Stopping criterion is a performance metric of choice (such as KS), or a combination of performance metrics. The above steps are repeated for the remaining seeds until performance starts to degrade.

The variable bundling approach described here includes:
1. Quantifying pair-wise co-operative strength for all variable pairs.
2. Identify variable cliques using the co-operation graph generated by step 1.
3. Building stage-1 models (with or without) feature selection on those variable cliques.
4. Building stage-2 model with feature selection on the outputs of stage-1 models.

Quantify pair-wise co-operative strength for all variable pairs is determined, in one example embodiment, as follows.

Let π(X) denote the "predictiveness" of a variable X given the target definition and training data. It should be noted that there are many ways of quantifying the predictiveness of a (set of) variable(s), including:

(a) Model Free methods: Correlation, Mutual information, Divergence, etc. with the target.

(b) Model Based methods: Train a model with the variable and measure the model performance, which in turn could be one of many ways, such as RMSE, KS, F1 measure, Detection rate at the operating point, etc.

In this particular embodiment, log-likelihood ratio from a logistic regression as the definition of π(X) was used. The LogLikelihood ratio significance test is computed by performing a logistic regression with each parameter omitted from the model and comparing the LogLikelihood ratio for the model with and without the parameter. We got the Log-Likelihood ratios for each individual variable and for every pair of variables.

Two variables are considered "co-operative" if their joint predictiveness exceeds the predictiveness of the individual variables. More specifically, a general class of functions to quantify co-operative coefficient between two variables is defined by:

$$c_{\pi,f,g,h}(X_p, X_q) = f(\pi(X_p, X_q)) \times \left( \frac{g(\pi(X_p, X_q))}{h(g(\pi(X_p)), g(\pi(X_p)))} - 1 \right)$$

There are two terms in the above function: The first term is given by the functions $f$, a monotonically non-decreasing function (possibly identity function) implying that higher the joint predictiveness, higher the co-operation coefficient between the variables. The second term quantifies the relative increase in the predictiveness from using the two variables separately to using them together. Here g is another monotonically non-decreasing function (log, sqrt, identity) and h is the aggregation function (min, max, arithmetic mean, geometric mean).

The variable cliques were determined using co-operation graph. The pair-wise co-operation between all variables results in a graph with D nodes, one for each variable and D choose 2 edges at most (if all co-operations are non-zero). This graph is then mined to find "soft-cliques". Before defining a soft-clique, it is necessary to define cohesiveness of a collection of a node-set. The definition should be such that the coherence is high only when each node in the node-set has a high co-operative coefficient with every other node in the node-set. In other words, even if one node in the node-set has a low co-operative coefficient with any of the other nodes, the overall coherence of the node-set is low. This is captured by the minimum of the first un-normalized eigen vector value of the submatrix formed by the node-set.

$$\psi(x \mid C) = \lambda_1(C(x)) \times \min_i e_{1,i}(C(x))$$

A soft clique is now defined as a node-set with a local maxima with respect to its coherence i.e. removing a node or adding another node to the node-set will result in the decrease in the coherence of the node-set:

$$\text{CLIQUE}(x \mid C) \Leftrightarrow \begin{cases} \psi(x \mid C) \geq \max_{x' \in X - x} \{\psi(x \oplus x' \mid C)\} \text{ and} \\ \psi(x \mid C) \geq \max_{x' \in x} \{\psi(x \setminus x' \mid C)\} \end{cases}$$

Since a graph with N nodes has $O(2^N)$ possible node-sets as candidate cliques, exhaustive search is not possible and hence a greedy algorithm described below is used. Other variants of clique finding algorithm are also available There is an overlapping and non-overlapping version of this approach. In the overlapping version, a variable can be used in only one clique. In the non-overlapping version, a variable can be used on more than one clique.

Clique Finding Algorithm:
INPUTS:
C=co-operative coefficient graph,
K=maximum size of a clique
Algorithm (Forward Search):
1. Find the node pair with highest co-operative coefficient.
2. Keep adding more nodes to this until the cohesiveness drops or size K is reached.
3. Treat the resulting node-set as the next clique.
4. Remove all the edges (overlapping) or nodes (non-overlapping) of this node-set from the graph.
5. Repeat steps 1-4 until all edges (overlapping) or nodes (non-overlapping) have been removed.

More than one clique may be identified. For each clique found above, a logistic regression model is built. The feature selection within the clique may be turned on or off for further refinement of these models. A combined model (from the individual models for each clique) uses the outputs of the clique models as inputs. Second stage model uses all the stage one models as inputs and learns to predict the target.

Figure 6:
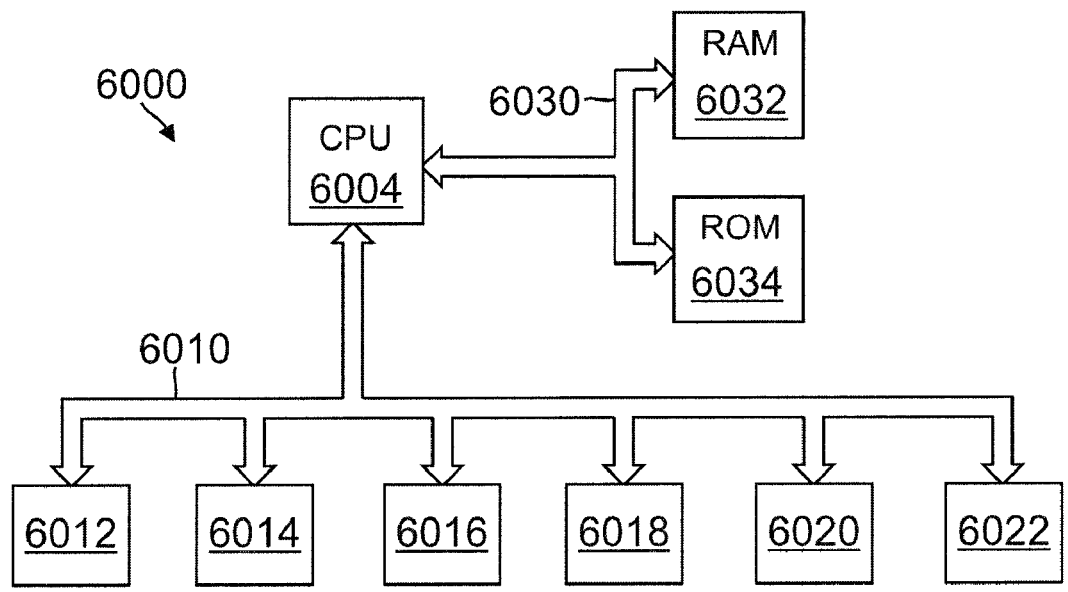
FIG. 6 is a computer system, according to an example embodiment.

FIG. 6 is a block diagram of a computer system 6000 that executes programming for performing the above discussed methods is shown in FIG. 8. A general computing device in the form of a computer 6010, may include a processing unit 6002, memory 6004, removable storage 6012, and non-removable storage 6014. Memory 6004 may include volatile memory 6006 and non volatile memory 6008. Computer 6010 may include or have access to a computing environment that includes a variety of computer-readable media, such as volatile memory 6006 and non-volatile memory 6008, removable storage 6012 and non-removable storage 6014. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 6010 may include or have access to a computing environment that includes input 6016, output 6018, and a communication connection 6020. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks. The microprocessor or other selected circuitry or components of the disk drive may be such a computer system.

Computer-readable instructions stored on a computer-readable medium are executable by the processing unit 6002 of the computer 6010. A hard drive, CD-ROM, and RAM are some examples of articles including a computer-readable medium. A machine-readable medium that provides instructions that, when executed by a machine, cause the machine to introduce a plurality of variables, quantify a co-operative strength value for a plurality of pairs of variables, and identify cliques of at least three variables based on a graph of the co-operative strength values of a plurality of pairs of variables. The machine-readable medium may also provide instructions that, when executed by a machine, further cause the machine to select a first pair of variables of the plurality of pairs of variables having a high co-operative strength value as well identify a second pair of variables related to a first selected pair of variables. The machine readable instruction set also adds at least one of the variables of the second pair of variables to the clique. The machine-readable medium, in some embodiments, provides instructions that, when executed by a machine, further cause the machine to test a clique after adding the at least one variable to determine if the clique includes a local maxima.

Figure 7:
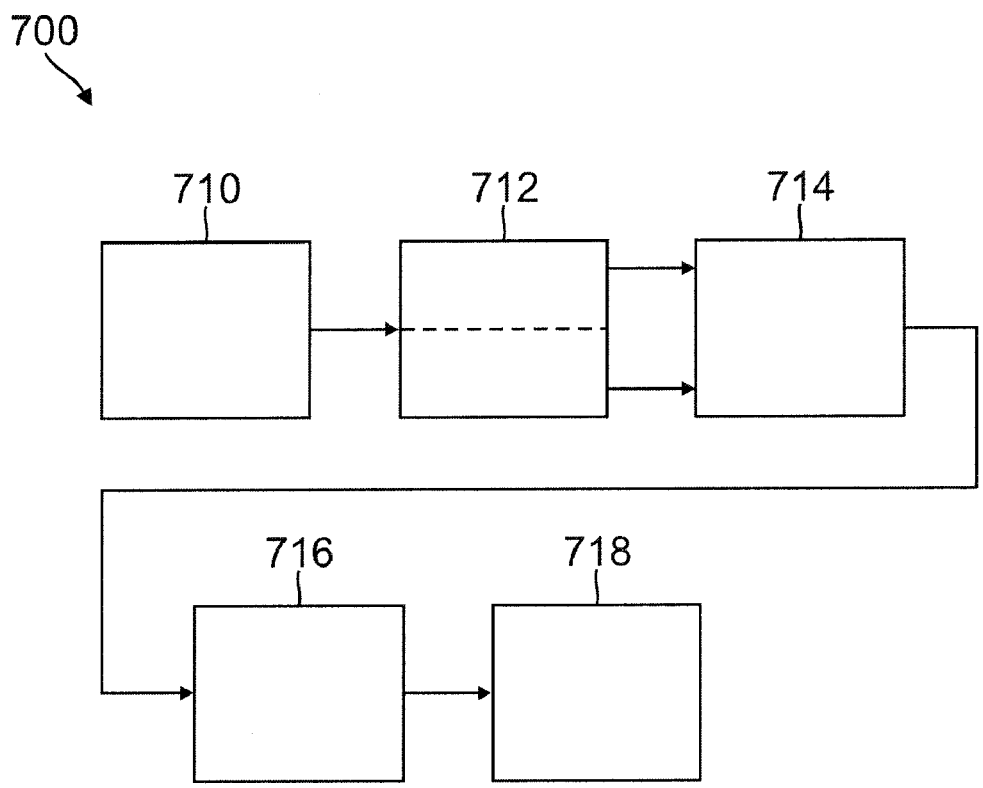
FIG. 7 is a schematic diagram of a system for making fraud determinations, according to an example embodiment.

FIG. 7 is a schematic diagram of a system 700 for classifying a transaction as fraudulent, according to an example embodiment. The system 700 includes a clique finding component 710 which acts on historical data to find a plurality of cliques including a first clique and a second clique. The system also includes a modeling component 712. The modeling component 712 is capable of forming a first stage predictive model based on variables in the first clique, and a first stage predictive model based on variables in the second clique. The system 700 also includes a second stage combiner 714 for forming a second stage model by combining the first stage predictive model for the first clique and the first stage predictive model for the second clique. The system 700 for classifying a transaction as fraudulent also includes a scoring component 716 that produces a score. The scoring component 716 includes a statistical model from each stage one model and a final score from the stage two combiner model 714 that produces an output. The system 700 for classifying a transaction as fraudulent also includes a classifier 718 for classifying the transaction as fraudulent when the output from the stage two combiner model is above a selected threshold value. The system 700 and individual components that make up each of the components of the system referred to above can be computer hardware, computer software or a combination of computer hardware and computer software.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A method for implementation by one or more data processors comprising:
    quantifying, by at least one data processor, a co-operative strength value for a plurality of pairs of variables; and
    identifying, by at least one data processor, a clique of at least three variables based on a graph of the co-operative strength values of a plurality of pairs of variables;
    identifying, by at least one data processor, a second clique of at least three variables based on the graph;
    building, by at least one data processor, a first model for the clique;
    building, by at least one data processor, a second model for the second clique; and
    building, by at least one data processor, a combined model based on at least one output from the first clique, and on at least one output from the second clique.

2. The method of claim 1, further comprising:
    selecting, by at least one data processor, a first pair of variables of the plurality of pairs of variables having a co-operative strength value that is higher than a co-operative strength value of other pairs of variables.

3. The method of claim 2, wherein finding the co-operative strength value between pairs of variables further comprises:
    using, by at least one data processor, supervised predictive co-operation and unsupervised correlation based co-operation between all attribute pairs that two variables of corresponding pair of variables can jointly take; and
    combining, by at least one data processor, the correlation between the two variables into a single variable pair co-operation strength.

4. The method of claim 2, wherein the identifying of the clique further includes identifying a second pair of variables related to a first selected pair of variables.

5. The method of claim 2, wherein the identifying of the clique further includes:
    identifying a second pair of variables related to a first selected pair of variables; and
    adding at least one variable of the second pair of variables to the clique.

6. The method of claim 2, wherein identifying a clique further includes:
    identifying a second pair of variables related to a first selected pair of variables;
    identifying a second pair of variables related to a first selected pair of variables;
    adding at least one of the variables of the second pair of variables to the clique; and
    testing a clique after adding the at least one variable to determine if the clique includes a local maxima.

7. The method of claim 6 wherein testing the clique includes determining if a cohesiveness value drops when a variable is added to the clique.

8. The method of claim 7, further comprising:
    adding, by at least one data processor, variables to the clique until a threshold size is met.

9. The method of claim 1 wherein a set of edges corresponding to the variables associated with the clique are removed before selecting a second clique.

10. A method for implementation by one or more data processors comprising:
- reading, by at least one data processor, historical transaction data;
- introducing, by at least one data processor, a set of variables;
- combining, by at least one data processor, the variables into pairs and determining a value for co-operative strength for each pair;
- selecting, by at least one data processor, a first pair based on having a co-operative strength value higher than the other pairs of variables;
- identifying, by at least one data processor, a first clique including at least three variables; modeling the first clique;
- identifying, by at least one data processor, a second clique including at least three variables;
- modeling, by at least one data processor, the second clique; and
- building, by at least one data processor, a third model based on an output from the model of the first clique and an output from the second clique.

11. The method of claim 10, further comprising:
- reading, by at least one data processor, real time transaction data;
- applying, by at least one data processor, a classification criteria to the real time transaction data;
- scoring, by at least one data processor, the real time transaction data; and
- classifying, by at least one data processor, the transaction data as fraudulent based on whether the score is above a predefined threshold.

12. A system comprising components implemented on at least one processor, the processor performing operations by executing instructions stored in a machine-readable medium, the components comprising:
- a clique finding component which acts on historical data to find a plurality of cliques including a first clique and a second clique;
- a first stage predictive model based on variables in the first clique;
- a first stage predictive model based on variables in the second clique; and
- a second stage combiner for forming a second stage model by combining the first stage predictive model for the first clique and the first stage predictive model for the second clique.

13. The system of claim 12, further comprising:
- a scoring component that produces a score,
- wherein the scoring component includes a statistical model from each stage one model and a final score from the stage two combiner model that produces an output, and
- wherein the transaction is classified as fraudulent when the output is above a selected threshold value.

14. The system of claim 13, further comprising:
- a classifier for classifying the transaction as fraudulent when the output from the stage two combiner model is above a selected threshold value.

15. A non-transitory machine-readable storage medium that provides instructions that, when executed by at least one machine, cause the machine to:
- introduce a plurality of variables;
- quantify a co-operative strength value for a plurality of pairs of variables; and
- identifying a first clique, a second clique, and a third clique of at least three variables based on a graph of the co-operative strength values of a plurality of pairs of variables;
- build a first model for the first clique;
- build a second model for the second clique; and
- build a combined model based on at least one output from the first clique, and on at least one output from the second clique.

16. The machine-readable medium of claim 15 that provides instructions that, when executed by a machine, further cause the machine to:
- select a first pair of variables of the plurality of pairs of variables having a co-operative strength value that is higher than a co-operative strength value of other pairs of variables.

17. The machine-readable medium of claim 16 that provides instructions that, when executed by a machine, further cause the machine to:
- identify a second pair of variables related to a first selected pair of variables; and
- add at least one of the variables of the second pair of variables to the clique.

18. The machine-readable medium of claim 17 that provides instructions that, when executed by a machine, further cause the machine to:
- test a clique after adding the at least one variable to determine if the clique includes a local maxima.

* * * * *